Aug. 21, 1962 C. ULMAN 3,050,225

MAGNETIC RECORDER

Filed Feb. 7, 1958 6 Sheets-Sheet 1

Inventor,
Charles Ulman
By: Schneider, Dressler, Goldsmith & Clement
Attys.

Aug. 21, 1962 C. ULMAN 3,050,225

MAGNETIC RECORDER

Filed Feb. 7, 1958 6 Sheets-Sheet 2

Inventor,
Charles Ulman,
By: Schneider, Dressler, Goldsmith & Clement, Attys.

Inventor
Charles Ulman,
By: Schneider, Dressler, Goldsmith & Clement, Attys.

Aug. 21, 1962 C. ULMAN 3,050,225

MAGNETIC RECORDER

Filed Feb. 7, 1958 6 Sheets-Sheet 4

Inventor,
Charles Ulman,
By: Schneider, Dressler, Goldsmith & Clement, Attys.

Inventor,
Charles Ulman,
By: Schneider, Dressler, Goldsmith & Clement, Attys.

Aug. 21, 1962 C. ULMAN 3,050,225

MAGNETIC RECORDER

Filed Feb. 7, 1958 6 Sheets-Sheet 6

Inventor,
Charles Ulman,
By: Schneider, Dressler, Goldsmith & Clement, Attys.

United States Patent Office 3,050,225 Patented Aug. 21, 1962

3,050,225
MAGNETIC RECORDER
Charles Ulman, 4106 S. Home Ave., Berwyn, Ill.
Filed Feb. 7, 1958, Ser. No. 713,942
13 Claims. (Cl. 226—51)

The present invention relates to magnetic recorders and particularly to the drive and control system for the recorders.

Magnetic recorder drive mechanisms generally are equipped to unwind a recording medium such as a wire or tape from a reel or spool and rewind it on another reel or spool after it passes a recording and/or playback head.

It has been found desirable to record on only one lateral half of a tape as the tape passes a recording head. This has the effect of doubling the length of the tape. Recording in this manner is known as dual track recording.

Dual track recording is usually accomplished by either inverting the reels on the recorder after recording along one side of the tape or by reversing the direction of drive of the tape after recording on one side and utilizing two heads or vertically shifting one head. These methods of providing dual track recordings generally were followed manually and the recordings were usually interrupted with a result that part of the signal to be recorded was lost.

By the present invention this difficulty is overcome and there is provided a magnetic recorder drive mechanism that automatically reverses the direction of drive when the end of the record medium, the tape or wire, is approached. Hereinafter, "tape" is used to designate any magnetic record medium. Mechanisms embodying this invention may be operative to reverse the drive direction independently of the initial direction and thereby be effective to substantially continuously record intelligence signals without interruption and to play back those signals without interruption.

Recorders in common use today are operative at either of two speeds, 3¾ and 7½ inches per second. In most of these mechanisms speed changes are made either by motor connection changes or by changes in belt and pulley couplings between the motor and the reels and capstan. These machines are so set up that the machine must be stopped before the speed setting of the machine can be changed. This often causes an inconvenience to the operator and may cause loss of recording time and improper recording where rapid speed changing is required.

By the present invention, however, the speed changing may be effected rapidly while the machine is in operation and while the machine is recording.

The speed changing mechanism of the present invention is incorporated in the drive mechanism which also provides a positive drive coupling between the drive motor and the capstan so that, at any particular selected speed, the capstan will be driven at a constant speed. Machines that use drive couplings such as belts and pulleys are subject to creating "wows" etc. in recordings due to slippage and other mechanical faults.

An automatic stop mechanism is provided to stop the machine if the tape accidentally breaks while traveling in either direction. This prevents the tape from unwinding from the reels until the operator can make the necessary repairs. The mechanism of this invention also includes means to stop recording or playback operations without deenergizing the recording-playback heads, the capstan drive or the reel drive so that continuation of these operations may be effected instantaneously. By this means "commercials" etc. may be omitted from the recording when a radio or television program is being recorded. This invention also includes means to erase prerecorded signals on the tape.

Numerous other features and advantages of the invention will become readily apparent to those skilled in the art and others from the following detailed description of the invention and illustrative embodiments thereof, from the claims, and from the accompanying drawings in which each and every detail shown is disclosed as a part of this specification, in which like reference numerals refer to like parts, and in which:

Figure 1:
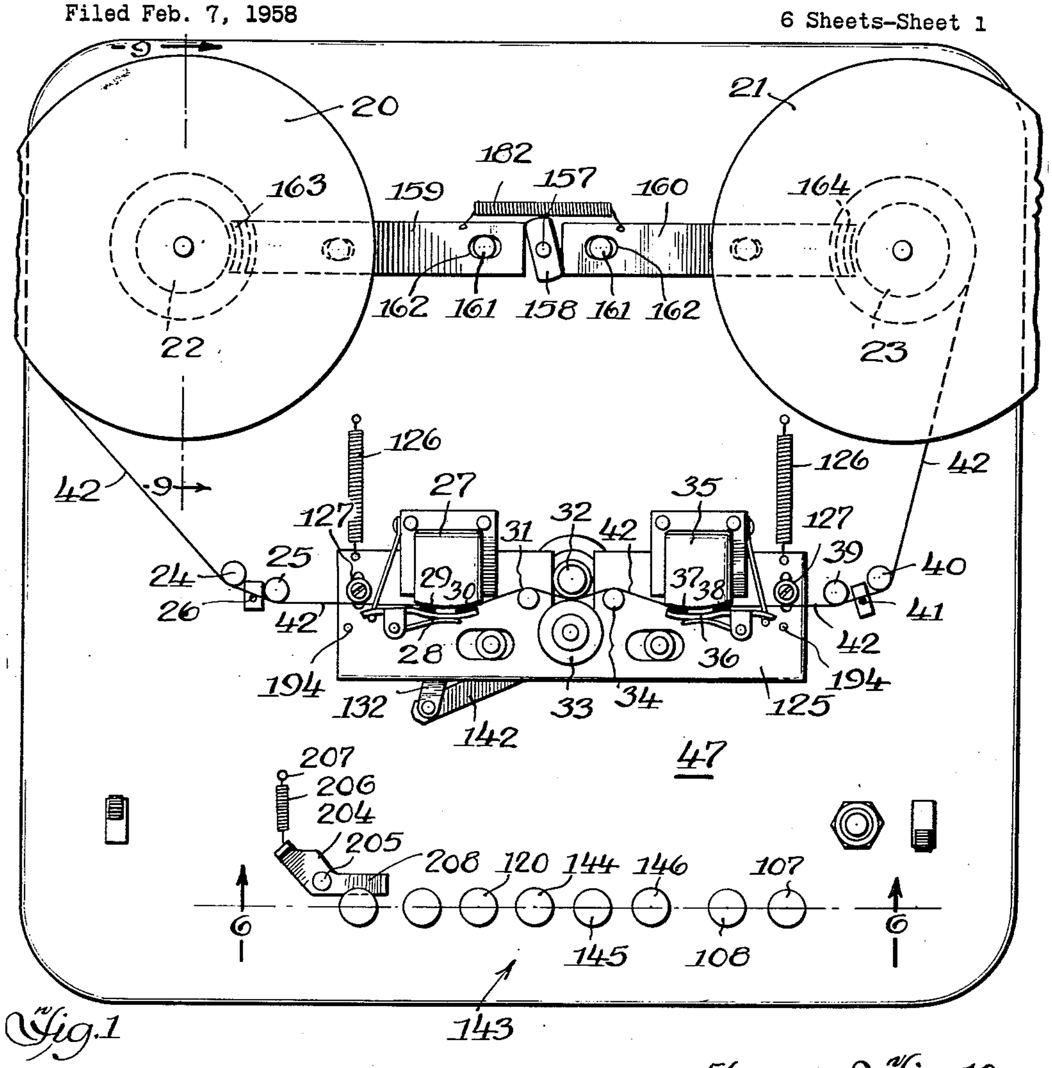
FIGURE 1 is a top plan view of a magnetic record drive mechanism embodying this invention.

A magnetic record translating mechanism embodying this invention is illustrated in FIGURE 1. The mechanism includes a pair of tape reels 20 and 21 carried on a pair of reel supports 22 and 23, respectively. The tape, when driven from reel 20 to reel 21 follows a path from reel 20 across automatic direction control and reversing contacts and guides 24 and 25 between which a tape sensing finger 26 engages the tape. From the tape guides 24 and 25, the tape proceeds across a first combination record, playback and erase head 27 against which the tape is pressed by a pressure pad holder 28 carrying a pair of pressure pads 29 and 30 which resiliently hold the tape against each of the gaps in the recording head.

The tape proceeds from head 27 around a guide 31 and then around capstan 32 against which the tape is pressed by an idler roller 33 to maintain the tape in firm frictional engagement with the capstan so that the capstan will control the speed of translational movement of the tape. Leaving the capstan, the tape proceeds around another guide 34 like the guide 31 and then across a second combination record, playback and erase head 35 against which the tape is pressed by a pressure pad holder 36 carrying a pair of pressure pads 37 and 38 that resiliently press the tape against the gaps in the head. After passing across the head 35, the tape crosses a second pair of automatic direction reversing control contacts and guides 39 and 40 between which the tape is engaged by a second tape sensing finger 41. The tape is then wound on reel 21. The path of the tape is indicated by broken line 42 in FIGURE 1.

The tape is wound on either reel 20 or 21 and unwound from the other reel. The direction of movement of the tape is controlled by controlling the direction of rotation of the capstan and the energization of the means used to rotate the reels. Tape speed is controlled by controlling the speed of the capstan.

In the illustrative embodiment of this invention shown in the drawings, the capstan and the reels are driven by individual motors with a reversible drive connection between the capstan motor and the capstan. The motors for the reels are unidirectional motors 43 and 44 that are releasably connected to the reel supports 22 and 23, respectively, through means such as slip coupling 45 illustrated in FIGURE 9.

Figure 9:
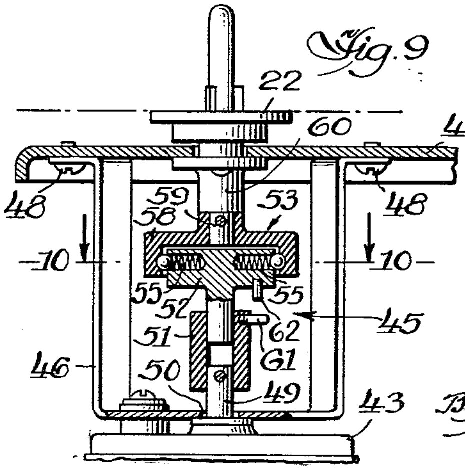
FIGURE 9 is a fragmental sectional view of the drive coupling between a reel motor and a reel viewed substantially along the line 9—9 of FIGURE 1.

Motor 43 is mounted on a bracket 46, see FIGURE 9, that is attached to the underside of the top deck plate 47 by screws 48 or any other convenient means. The motor shaft 49 extends upwardly through an aperture 50 in the bottom of the bracket and is connected to a coupling sleeve 51 that is also attached to the inner armature 52 of a ball clutch indicated generally at 53.

Figure 10:
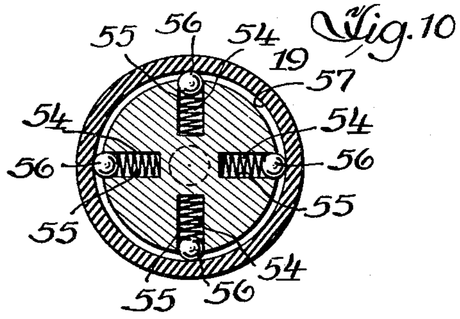
FIGURE 10 is a sectional view of the clutch assembly interconnecting the reel motor and the reel, viewed along the line 10—10 of FIGURE 9.

The armature 52 of the ball clutch has radial recesses 54—54, see FIGURE 10, in which springs 55 are seated. Balls 56 are biased by the springs radially outwardly against an inner race surface 57 on an outer armature 58 which overlies the inner armature 52. A shaft 59 on the outer armature is carried in bearings 60 mounted on the underside of the upper deck plate 47. The shaft 59 is connected to the reel support 22 for driving the reel 20 when pulling tape from the reel 21.

The reel 20 is rotated when the motor 43 is energized. Energization of motor 43 causes motor shaft 49 to rise thereby lifting the sleeve 51 to a height where the pin 61 that extends radially outwardly from the upper end of the sleeve, engages a pin 62 that depends from the inner armature 52, to drive the inner armature 52. The ball coupling between the two armatures operates as a slip clutch to drive the reel support 22.

When the motor 43 is deenergized, the motor armature shaft drops causing the pins 61 and 62 to disengage. This permits the reel to rotate freely.

Motor 44 is connected to reel support 23 and reel 21 by a coupling arrangement substantially identical to the coupling 45. These motors are selectively energizable for controlled directional operation of the mechanism.

The tape drive direction is controlled by selective energization of the reel motors 43 and 44 and by controlled directional rotation of the capstan 32. The drive arrangement for the capstan is shown in detail in FIGURES 3, 5 and 11.

Figures 4, 5, 12, 13, 14:
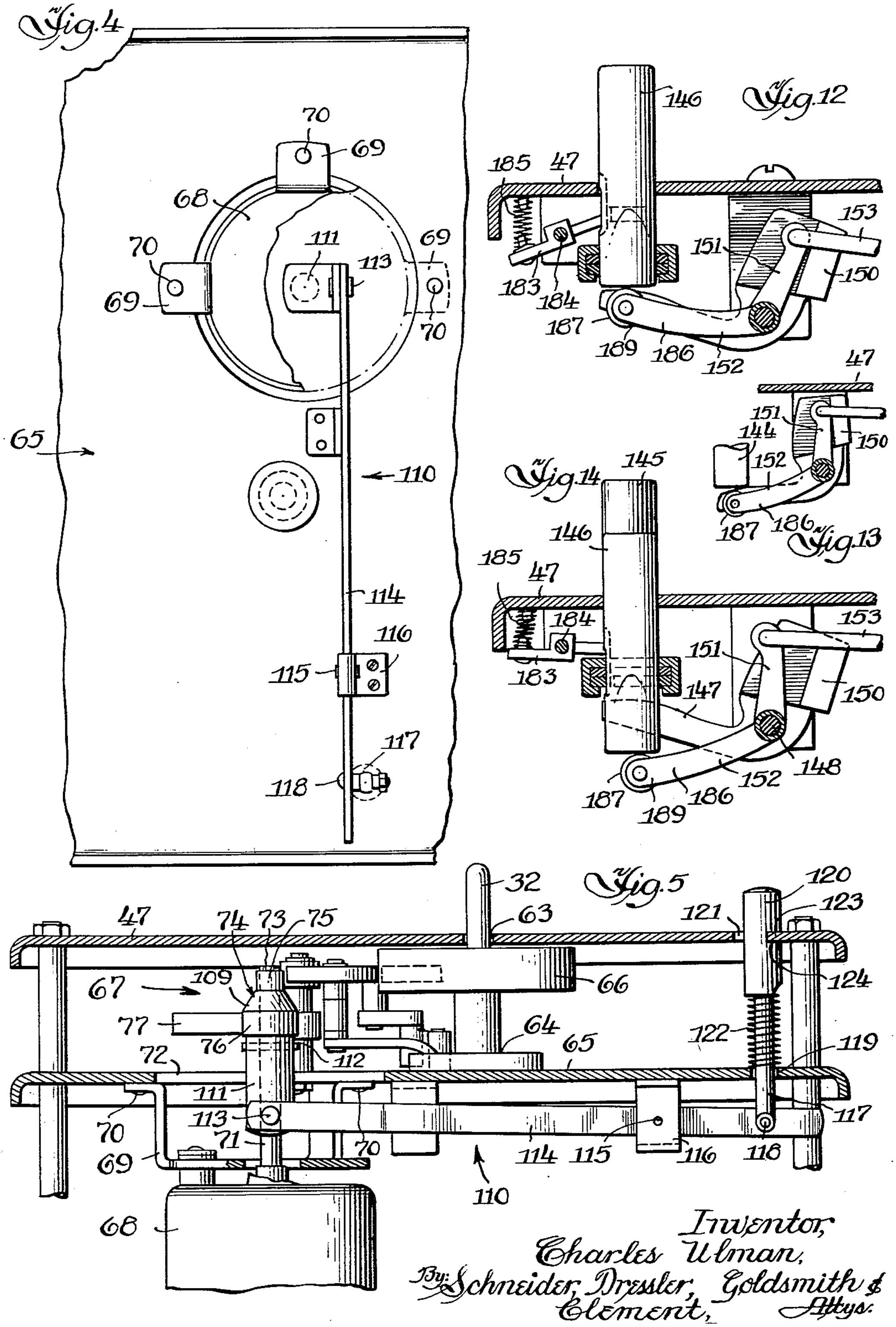
FIGURE 4 is a bottom plan view of a portion of the lower deck.
FIGURE 5 is a sectional view of the lower deck, viewed substantially along the line 5—5 of FIGURE 3.
FIGURE 12 is a fragmental sectional view of the stop control viewed substantially along the line 12—12 of FIGURE 6.
FIGURE 13 is a view like FIGURE 12 but showing the stop button depressed.
FIGURE 14 is a fragmental sectional view like FIGURE 12, but showing the fast forward and fast reverse button depressed.

The capstan 32, as seen in FIGURE 5, projects through an aperture 63 in the upper deck plate 47 and is supported on a bearing 64 mounted on the lower deck plate 65. Capstan 32 is secured to a flywheel 66 that is positively connected through a reversible idler coupling 67 to a capstan motor 68 for constant speed operation. The motor 68 is mounted on a bracket 69 that is secured to the underside of the lower deck plate 65 by any convenient means such as screws 70.

The motor shaft 71 of the capstan motor 68 extends vertically upwardly through an aperture 72 in the lower deck plate 65 and is splined at its upper end 73. A speed change roller 74 is loosely connected to the shaft 71 by the splines on the shaft so that it is freely axially movable along the shaft. The speed change roller 74 has a pair of roller surfaces 75 and 76 of different diameters so that vertical shifting of the roller 74 changes the speed of drive of the capstan by changing the coupling ratio between the motor 68 and the capstan 32.

Figures 3, 11:
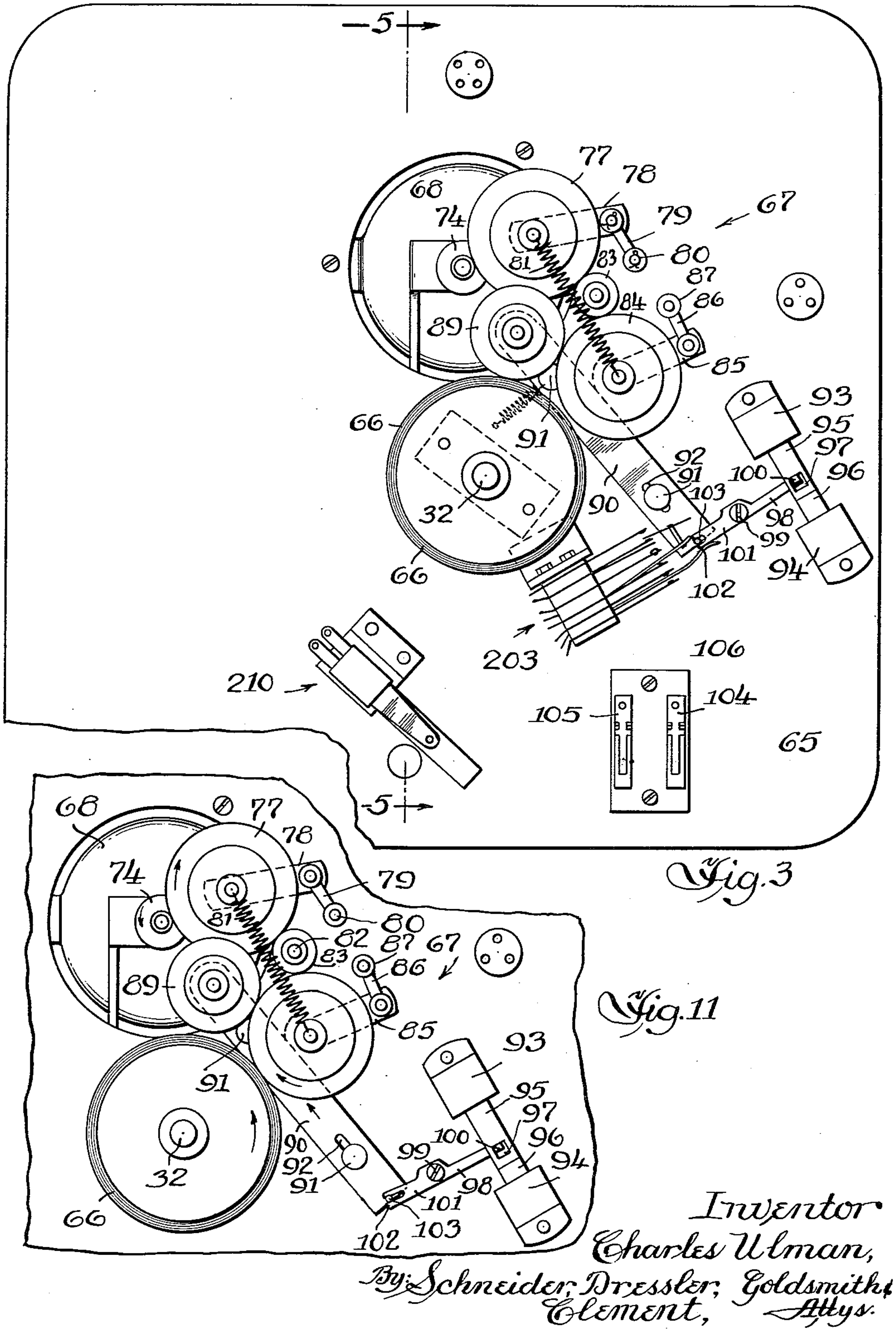
FIGURE 3 is a top plan view of the lower deck of the recorder illustrated in FIGURE 1.
FIGURE 11 is a view of the capstan drive coupling of FIGURE 3, but showing the coupling arranged to drive the capstan in the opposite direction.

The speed change roller 74 engages an idler roller 77 mounted on a floating arm 78, see FIGURES 3 and 11. The arm 78 is pivotally connected through a link 79 to a standard 80.

Idler 77 engages a fixed idler 83 journalled on a standard 82 and is biased against the speed change roller 74 and fixed idler 83 by a spring 81. A second floating idler 84 is mounted on a floating arm 85 pivotally connected through a link 86 to a standard 87. Idler 84 is biased toward fixed idler 83 and capstan flywheel 66, in FIGURE 11, by spring 81. The second floating idler 84 is driven by fixed idler 83. Idler 84 in turn drives the capstan flywheel in the arrangement shown in FIGURE 11.

The coupling arrangement shown in FIGURE 11 is effective to drive the tape in a right-hand direction from the reel 20 to the reel 21. FIGURE 3 illustrates the drive coupling shown in an arrangement that is effective to drive the capstan in a clockwise direction as viewed in FIGURE 1, to drive the tape to the left from reel 21 to reel 20. For this purpose, a shifting idler 89 is engaged in a coupling arrangement between the idler 84 and the flywheel 66 on the capstan.

The motor 68 continuously rotates in one direction, counterclockwise as viewed in FIGURES 3 and 11. By interposing the shifting idler 89 between the second floating idler 84 and the capstan flywheel 66, however, the direction of the rotation of the capstan is reversed.

The shifing idler 89 is journalled on one end of a reversing lever 90 slideably mounted on the upper surface of the lower deck plate 65 by a pair of rivets or pins 91 that extend through slots 92 in the reversing lever 90.

In FIGURE 3 the reversing lever is shown shifted to its forward position, viewed from the front of the mechanism so that the idler 89 is interposed between the idler 84 and the capstan flywheel 66. In FIGURE 11 the lever is shown shifted to its rearward position with the idler 89 out of engagement with the flywheel 66.

The lever 90 is shifted between these two positions by controlled energization of a pair of opposed solenoids 93 and 94. The armatures 95 and 96, respectively, of the solenoids are connected together at 97. An intermediate shifting lever 98, which is centrally pivoted about a screw or pin 99 fixed to the lower deck plate 65 is connected to both armatures 95 and 96 by an upwardly extending finger 100 on one arm of the lever 98. The opposite arm 101 is bifurcated at its end 102 and has fingers that extend to opposite sides of a pin 103 fixed at the end of the reversing lever 90.

Selective energization of the solenoids 93 and 94 controls the position of the reversing lever 90 to effect selective right-hand or left-hand drive for the capstan 32. Thus, energization of the solenoid 93 will bring idler 89 into engagement with the idler 84 and flywheel 66 to effect left-hand drive of the capstan. Energization of solenoid 94 will shift the idler 89 upwardly to the position shown in FIGURE 11 to effect right-hand drive of the capstan 32.

Right and left-hand control switches 104 and 105, respectively, fixed on a single mounting block 106, are secured to the lower deck plate 65. They are positioned immediately below right and left-hand manual control buttons 107 and 108 of the control button assembly mounted at the front of the upper deck plate 47, see FIGURES 1 and 6. Depressing right-hand control button 107 will close switch 104 to energize right-hand drive control solenoid 94. Depressing left-hand control button 108 will close the switch 105 to energize the left-hand control solenoid 93.

Speed changing, as stated hereinabove, is effective by controlling vertical movement of the speed-change roller 74 connected to the shaft 71 of the capstan drive motor 68 in a splined connection. Speed-change roller 74 has two or more roller surfaces 75 and 76 for driving engagement with the periphery of idler 77, see FIGURE 5. When speed-change roller 75 is in its uppermost position, the larger diameter roller surface 76 engages the idler 77 to drive the same at an increased speed. When the speed-change roller 74 is lowered, the roller surface 75 engages the periphery of idler 77 to drive the same at a reduced speed.

Speed-change roller 74 is provided with a conical region 109 so that the roller may be vertically moved while the capstan drive motor 68 is running. Movement of the speed-change roller 74 is effected through a speed-change control linkage 110, see FIGURES 4 and 5. A bifurcated lever 111 is received in an annular recess 112 in the speed-change roller 74 below roller drive surface 76. Link 111 is pivotally connected at 113 to a speed-change lever 114, at one end of the lever. Near its other end, the lever 114 is pivotally connected, as at 115, to a bracket 116 secured to the underside of the lower deck plate 65. At the end of the lever 114 opposite to pivotal connection 113, a connecting pin 117 is pivotally connected, as at 118, to the lever. Pin 117 extends upwardly through an aperture 119 in lower deck plate 65 and is fixed in a speed change button 120 that extends upwardly through an aperture 121 in upper deck plate 47.

A spring 122 surrounds pin 117 and is tensioned between the lower deck plate 65 and the bottom of the speed-change control button 120. Spring 122 biases the whole speed-change mechanism and linkage toward a low speed position inasmuch as it biases the speed-change button 120 upwardly and biases the speed-change roller 74 downwardly toward a position where roller surface 75 engages the periphery of idler 77.

Speed change button 120 when depressed operates through linkage 110 to move the speed-change roller 74 to its upper or high speed position as shown in FIGURE 5. The speed-change mechanism may be locked in this position by engagement of a portion 123 of the upper deck plate 47 adjacent to the aperture 121 in a recess 124 in the speed-change button 120.

During operation of the machine the tape travels through a path indicated by the broken line 42 as described hereinabove and as shown in FIGURE 1. The tape is pressed against heads 27 and 35 by pressure pads and against the capstan 32 by idler 33. The pressure pad holders 28 and 36, the idler 33 and guide posts 31 and 34 are mounted on a shiftable carriage plate 125. The carriage plate 125 is normally biased to an operating position for pressing the tape against the heads and the capstan by a pair of assist springs 126. One end of each spring is connected to the carriage and the other end of each spring is connected to upper deck plate 47.

Figures 6, 7:
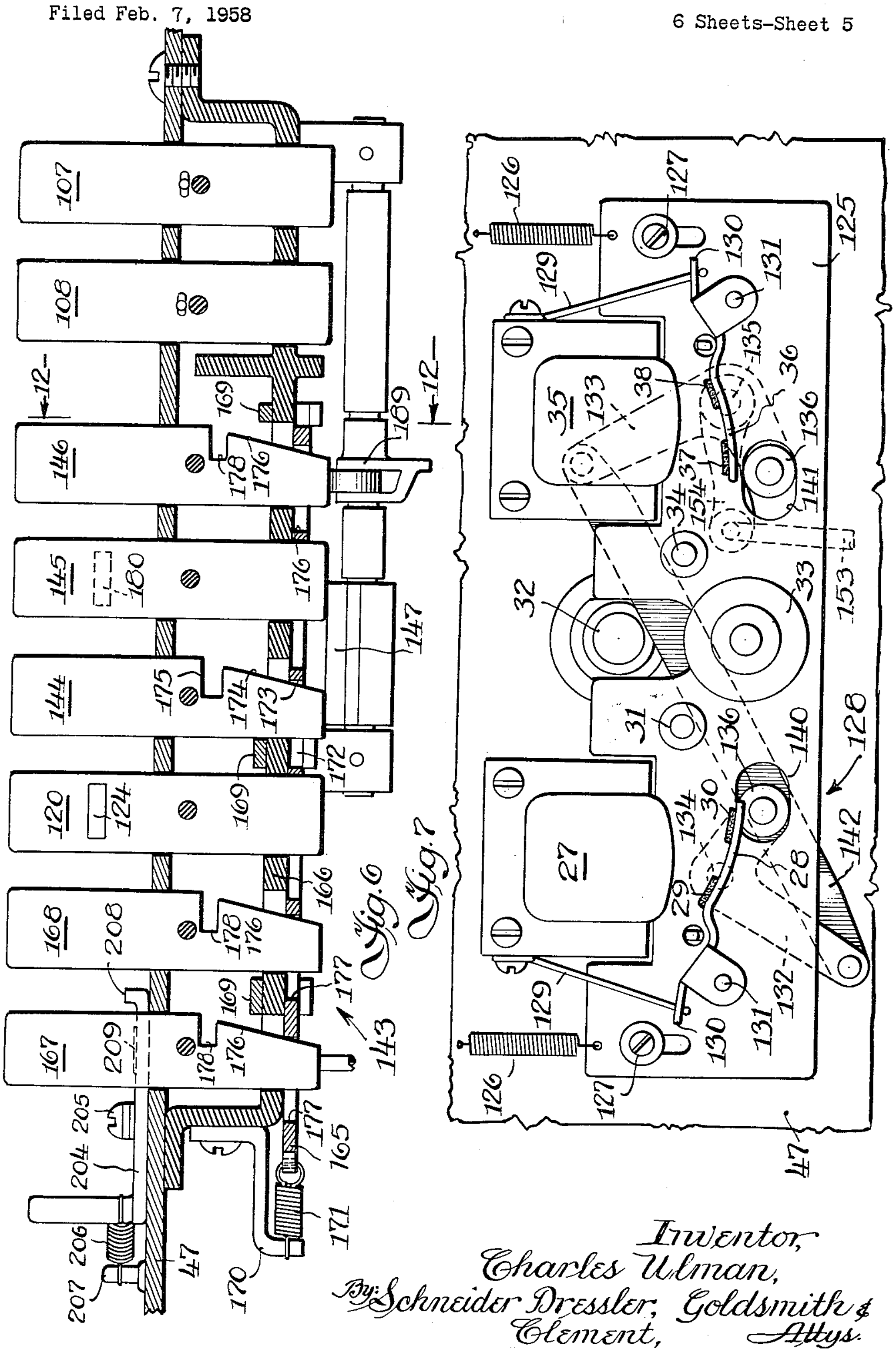
FIGURE 6 is a fragmental sectional view of the push button control panel, viewed substantially along the line 6—6 of FIGURE 1.
FIGURE 7 is an enlarged fragmental view of the carriage and recording head portion of the mechanism.

The carriage is forwardly and rearwardly slideable on a pair of standoff posts 127 that support the carriage above a carriage shifting linkage 128 as shown in detail in FIGURE 7. The carriage is shown shifted away from the heads 27 and 35 and the capstan 32 in FIGURE 7 while in FIGURE 1 the carriage is shown in a position closed onto the heads 27 and 35 and the capstan 32 for driving the tape.

Each of the pad holders 28 and 36 is normally biased toward the heads by a spring. When the carriage is shifted away from the heads 27 and 35, an arm 129 secured to the side of each head engage an ear 130 on the outer end of each pad holder and causes the pad holders to rotate outwardly about pivots 131 which support the pad holders on the carriage plate 125.

To shift the carriage plate away from the heads and away from the capstan, the linkage 128 is actuated by any one of several control devices utilized on the machine. The carriage may be shifted to a position away from the heads and capstan by actuation of the stop button or the pause button or the fast wind or rewind button. Upon actuation of any of these buttons the linkage moves the carriage plate. The linkage itself includes a pair of bell crank levers 132 and 133 which are connected to pivots 134 and 135, respectively, mounted on the upper deck plate 47. The short arms of the bell crank levers 132 and 133 carry rollers 136 thereon to engage slots 140 and 141, respectively, in the carriage plate 125. The ends of the long arms of the bell crank levers are connected together by a link 142 so that the two levers will move simultaneously. Levers 132 and 133 are oppositely arranged and their pivots 134 and 135 are aligned transversely of carriage plate 125 so that counterclockwise movement of lever 133 will be transmitted through link 142 to lever 132 to cause lever 132 to move clockwise through an equal angle to the angle of movement of lever 133. This will result in equal displacement of rollers 136 and uniform forward or rearward motion of carriage plate 125.

Rotation of bell crank levers 132 and 133 is controlled from the push button control panel indicated generally at 143 at the front of the machine in FIGURE 1. The carriage is moved away from the heads 27 and 35 and away from the capstan 32 whenever stop button 144 or pause button 145 or fast forward or fast reverse button 146 are depressed.

Movement of stop button 144 causes a control lever 147, seen in FIGURES 2, 6, 12, 13 and 14, to pivot about a carriage control shaft 148 mounted on a pair of brackets 149 that depend from the underside of upper deck plate 47. Lever 147 is substantially bell crank shaped and has an upwardly and laterally extending arm 150 that overlaps the arm 151 of the fast speed-control lever 152, which is also journalled on shaft 148 and laterally displaced from lever 147. The free end of arm 151 of lever 152 is connected through a link 153 to a crank lever 154 fixed on the lower end of pivot pin 135. Pivot pin 135 extends through the upper deck plate 47 and is fixed in bell crank lever 133 so that rotation of lever 154 will cause movement of carriage plate 125 and all of the parts of the recorder carried thereon.

When stop button 144 is depressed, arm 150 on the lever 147 engages arm 151 on the fast wind and rewind control lever 152 and causes lever 152 to rotate counterclockwise as seen in FIGURES 12 and 13. This causes forward motion of the link 153 and rotates levers 154, 133 and 132 to move the carriage forward toward the front of the machine and away from heads 27 and 35 and capstan 32.

Figure 2:
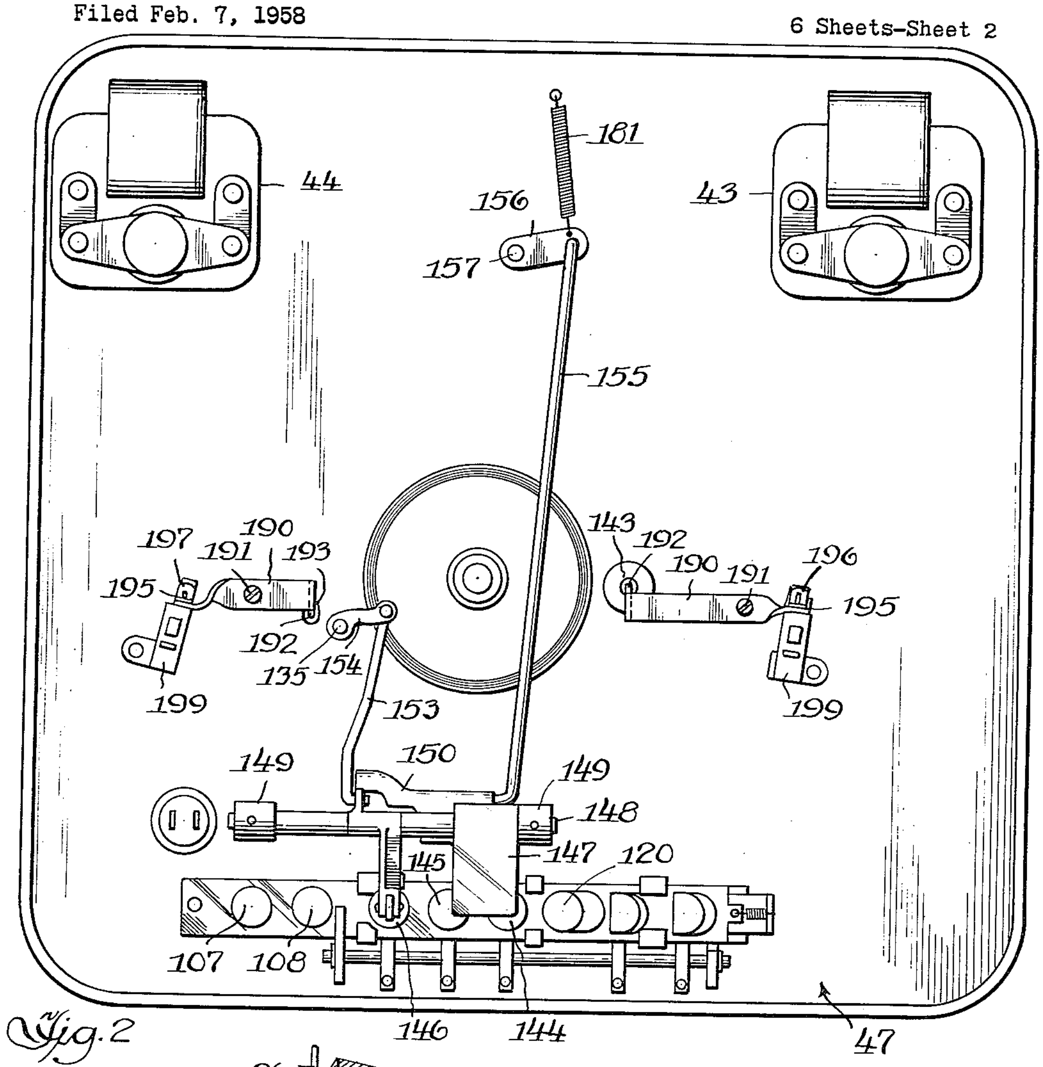
FIGURE 2 is a bottom plan view of the top deck of the recorder illustrated in FIGURE 1.

Depressing stop button 144 also actuates a brake mechanism shown in FIGURES 1 and 2 to stop rotation of the reels. The upper end of arm 150 is connected through a link 155 to a lever 156 that is fixed on the lower end of a brake cam pin 157. The upper end of brake cam pin 157 is secured to a brake cam 158, FIGURE 1. Brake arms 159 and 160 are disposed on opposite sides of brake cam 158 to engage the cam and to be shifted laterally by the brake cam. The brake arms are slidably mounted on the upper deck plate 47 by pins or rivets 161 that extend through apertures 162 in the arms 159 and 160.

The outer ends of brake arms 159 and 160 carry brake shoes 163 and 164, respectively, disposed to engage the periphery of reel supports 22 and 23, respectively. The periphery of the reel supports act as brake drums in cooperation with brake shoes 163 and 164.

Brake cam 158 is configurated so that rotation thereof from a position where its major axis is disposed substantially straight forwardly and rearwardly of the machine, will cause brake arms 159 and 160 to move laterally outwardly so that brake shoes 163 and 164 will engage the reel supports 22 and 23 to stop the machine. When the stop button is depressed lever 147 is rotated and causes the cam 158 to rotate counterclockwise and thereby effect braking of the reel supports 22 and 23.

The stop button 144, when depressed, will be held in its depressed position by a push button locking bar 165 slideably supported on the underside of a push button mounting bracket 166 secured to the underside of the upper deck plate 47. The mounting bracket 166 and the locking bar 165 are each provided with a plurality of apertures to accommodate movement of the push buttons therethrough. The locking bar 165, however, is not as long as mounting bracket 166 in that it does not extend past direction control buttons 107 and 108. The length of the locking bar is only great enough to accommodate record-start button 167, playback button 168, speed-change button 120, stop button 144, pause button 145 and fast forward or fast reverse button 146.

Locking bar 165 is slideably mounted on clips 169 that hold the locking bar on bracket 166. A spring bracket 170 fixed at one end of the mounting bracket 166 is connected through a biasing spring 171 to one end of locking bar 165 to bias the locking bar in a direction to lock the various buttons when they are depressed. That is, locking bar 165 is biased to the left as viewed in FIGURE 6 by spring 171.

Aperture 172 in locking bar 165 is of such size that it will permit stop button 144 to move downwardly when pressed by the operator of the machine. The right-hand edge 173 of the aperture 172 rides on a tapered cam face 174 on the right side of the stop button at the lower end thereof until the stop button is depressed far enough for biasing spring 171 to move stop bar 165 to the left and cause the bar to move into a locking recess 175 at the top of the cam face 174.

The tapered cam face 174 is provided on stop button 144 so that when the stop button is depressed to stop operation of the machine, all other depressed buttons in the push button control panel 143 will be released from the locking bar. The buttons which are normally locked by the locking bar are record button 167, playback button 168 and fast forward or fast reverse button 146 as well as stop button 144. Each of these buttons is configurated substantially the same as stop button 144. They have cam faces 176 of the same shape as cam face 174 and co-operate with apertures 177 in locking bar 165. These buttons are also provided with a locking recess 178 of the same shape and size as locking recess 175 in the stop button 144. Thus, when the record button or the playback button or the stop button or the fast forward or fast reverse button are depressed, any other one of these buttons that had been depressed and locked by locking bar 165 is released to return to its upper or original position.

Speed-change button 120, pause button 145, left direction control button 108 and right direction control button 107 are not provided with cam faces or locking recesses to cooperate with the locking bar 165 since movement of any one of these buttons should not effect release of any other button that may be depressed and locked by locking bar 165.

Pause button 145 may be locked in a depressed position in the same way that the speed-change button is locked. The pause button is provided with a locking recess 180 that cooperates with a portion of upper deck plate 47 immediately surrounding the aperture in the plate through which the pause button moves.

When pause button 145 is depressed for permitting the operator to effect a temporary non-recording or playback condition, but to leave the machine in a recording or playback state, except for movement of the tape, the carriage 125 is retracted and the reels are stopped by engagement of the brakes. Both of these operations are accomplished in the same way that they are accomplished when stop button 144 is depressed, see FIGURES 12 and 13. That is, when pause button 145 is depressed, lever 147 will rotate counterclockwise as viewed in FIGURES 12 and 13, causing lever 152 to pull on link 153 and rotate levers 154, 133 and 135 to retract carriage 125 from heads 27 and 35 and from capstan 32. At the same time link 155 will be pulled causing lever 156 and brake cam 158 to rotate thereby moving brake arms 159 and 160 to positions where brake shoes 163 and 164 engage reel supports 22 and 23.

Since none of the other buttons are released when the pause button is depressed, the mechanism will continue to operate except that the tape will stop moving and be released from the heads and the capstan. The pause button may be locked in position by engagement of a portion of the upper deck plate 47 in recess 180 or it may be held depressed manually. As soon as it is released, brake release assist springs 181 and 182 will cause brake cam 158 to return to its normal position and cause brake shoes 163 and 164 to retract from reel supports 22 and 23. Also, carriage assist springs 126 will return the carriage to a position where the tape is pressed against the heads by pressure pad holders 28 and 36 and against capstan 32 by idler 33.

The brake cam return assist spring 181 will cause the lever 147 to return to its normal position, thereby raising the pause button 145 to its normal position. Pause button 145 is also raised to its normal position by a button return lever 183, FIGURES 12 and 14, which is pivotally supported as at 184 below the upper deck place 47 and has one end connected to the control button and the other end biased upwardly by a button return spring 185. All of the control buttons in the control panel 143 are equipped with these return levers and springs to return them to a normal position therefor when released either from their locking means or from manual pressure or both.

It is often desirable to run the magnetic record medium translating mechanism of this invention at a substantially higher than normal rate of speed for such purposes as winding or rewinding the record medium on a reel or to rapidly advance the tape so as to effectively skip a portion of the tape. The mechanism of the present invention is equipped to effect such fast forward or reverse or fast right or left movement of the tape.

Reel motors 43 and 44 are effective to drive the reels at substantially higher rates of speed than the capstan is driven by the capstan motor. Thus, when the tape is released from the capstan it will be wound on the reels at a greater rate than when it is controlled by the capstan.

To release the tape from the capstan, the mechanism of this invention is provided with a fast forward or fast reverse control button 146 which, when depressed, will engage and depress arm 186 of lever 152. This causes lever 152 to rotate about shaft 148 in a counterclockwise direction as seen in FIGURE 14. Arm 151 then pulls link 153 forwardly to rotate lever 154 clockwise as seen in FIGURE 12. The levers 132 and 133 are then rotated to retract the carriage 125 from the heads 27 and 35 and the capstan 32 thereby releasing the tape from these members.

At the same time cam face 176 on the fast forward or fast reverse control button shifts locking bar 165 to release the record button or playback button or stop button, whichever one thereof may have been depressed and locked by the locking bar. Smooth motion of the operation of this fast forward and fast reverse control is effected by roller engagement between the arm 186 and the lever 152 and the control button 146. A roller 187 is journalled in the bifurcated end 189 of the lever arm 186 to engage the bottom of button 146.

When the record button or playback button or stop button is depressed, fast forward or fast reverse control button 146 will be released. It will be returned to its upper position by a spring return mechanism or by an upward force applied against the button thereof from the lever 152. Lever 152 is returned to its normal position by biasing forces applied through the carriage shifting linkage and carriage assist springs 126.

Figure 8:
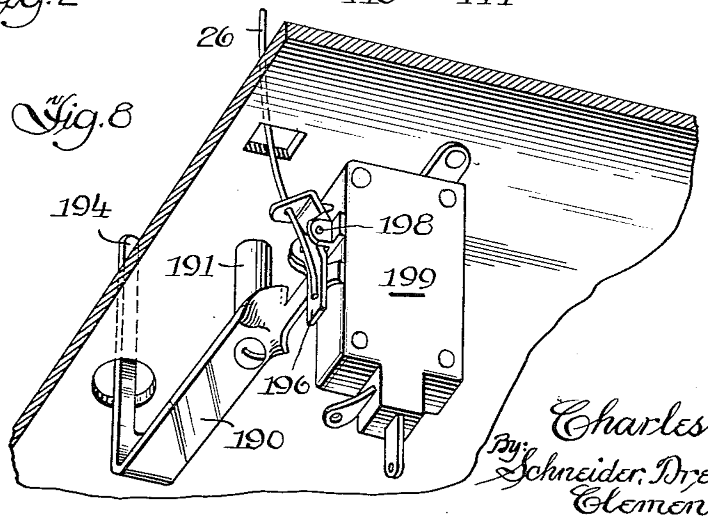
FIGURE 8 is an enlarged fragmental perspective view of the tape sensing control.

Whenever carriage 125 is shifted away from the heads, tape sensing fingers 26 and 41 are retracted from engagement with the tape. Levers 190, FIGURES 2 and 8, are pivotally mounted on the underside of top deck plate 47 by depending pivot supports 191. Each of these levers has an upstanding arm 192 that extends upwardly through apertures 193 in the top deck plate 47. The upper ends 194 of arms 192 are loosely connected to the carriage plate 125, as at 194, for movement together with the plate whenever the plate is shifted. Thus, shifting of the carriage plate 125 will cause the levers 190 to rotate. The other end 195 of each of the levers 190 abuts spring biased mounting brackets 196 and 197 to which the tape sensing fingers 26 and 41, respectively, are connected. Retracting carriage plate 125 will cause the sensing fingers 26 and 41 to pivot with mounting brackets 196 and 197 about their pivots 198, FIGURE 8, so that the upper free end of the sensing fingers is retracted away from the path of the tape.

Mounting brackets 196 and 197 are mounted on micro-switches 199 and 200. These switches are connected in the control system to stop the machine when the tape breaks. Micro-switches 199 and 200 are controlled by tape sensing fingers 26 and 41 and are actuated when either of the fingers moves past the tape path 42, such as when the tape breaks.

Figure 16:
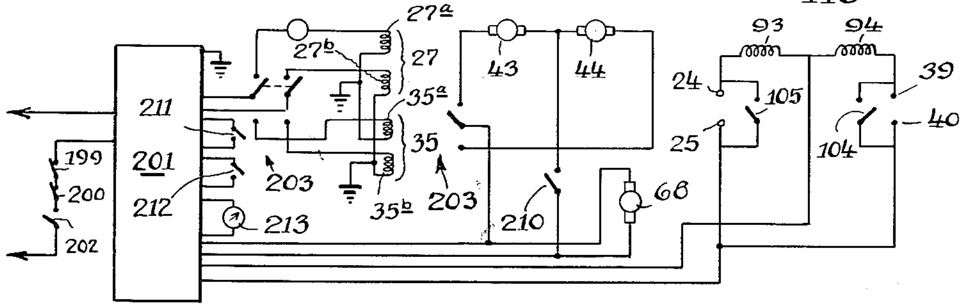
FIGURE 16 is a block and schematic diagram of the electrical controls of the mechanism of the present invention.

The mechanism described herein for translating and driving a magnetic record medium, is used in conjunction with an amplifier and oscillator indicated generally at 201 in FIGURE 16. The amplifier may be of the conventional type used in magnetic recording and reproducing apparatus and includes an audio amplifier and an erase and bias oscillator connected to the heads 27 and 35. Each of the heads 27 and 35 has a pair of gaps therein, one of which is an erase gap and the other of which is a recording and reproducing gap. In FIGURE 16 there are shown a pair of windings 27*a* and 27*b* for the head 27 and a pair of windings 35*a* and 35*b* for the head 35.

The mechanism is started by closing the main power switch 202 to the amplifier 201. This energizes the capstan motor 68 which in turn drives the capstan through the idler arrangement 67 shown in FIGURE 3.

A reel of tape is then placed on one of the reel supports 22 and 23 and threaded through the carriage arrangement along path 42. The appropriate direction switch 104 or 105 is then depressed to energize one of the direction control solenoids.

The position of lever 98 connected to direction control solenoids 93 and 94 controls the direction of rotation of the capstan and the connections in a double throw multiple pole switch assembly indicated generally at 203. Switch assembly 203 controls selective energization of the reel motors 43 and 44 and selective energization of the recording and erase heads 27 and 35.

The machine is now in condition for recording, and the record button 167 may now be depressed to control selective energization of the motors 43 and 44 and the heads 27 and 35. To depress the recording control button 167, a safety lock lever 204, FIGURES 1 and 6, is rotated counterclockwise as seen in FIGURE 1, about a central pivot 205, against the force of a biasing spring 206 connected to the lever and to a post 207 on the upper deck plate 47, to move the locking leg 208 of the lever out of engagement with a locking recess 209 in the record button. When the record button 167 is depressed, the lock bar 165 is moved to the right to release the stop button 144 thereby releasing the brakes and releasing the linkage which holds the carriage 125 out of engagement with the heads and the capstan. At the same time, upward movement of the stop switch button 144 permits the lever 147 to rotate to its normal position thereby closing switch 210 in the reel motor circuit to energize the appropriate one thereof to pull on the tape and wind the same on a reel after it has passed over the carriage assembly, the recording heads and the capstan. The switch 210 is directly below stop button 144.

As the end of the tape is approached, a conductive length thereof, such as a short length of tape having metal foil thereon, contacts the automatic reversing contact posts 24 and 25 or 39 and 40, depending upon the direction in which the tape is moving. This closes the circuit to the appropriate one of the direction control solenoids 93 and 94 to automatically reverse the mechanism. Through the lever 98, the appropriate reel motor 43 and 44 is energized and the recording and erase currents are switched to the appropriate head 27 or 35 by controlled reversing of the switch 203. Since the gaps in the heads are set at different heights, respectively, one head will record and erase or play back on a lower transverse half of the tape while the other will record on the upper transverse half of the tape. This permits dual tract recording and efficient utilization of the magnetic record medium.

If the tape should break, switches 199 or 200 or both will open by pressure from the sensing fingers 26 and 41 thereby shutting off the mechanism entirely. These switches are in the main power circuit to the amplifier and the translating mechanism.

In addition to the foregoing, the mechanism of this invention is equipped with a switch 211 to control any speaker or monitoring device that may be utilized. The mechanism is also provided with a switch 212 which is effective to cut off current to the recording gap in the head to permit erasure of any previously recorded signals on the tape.

The mechanism of this invention is also equipped with an output meter 213 for visual determination of the recording level of any signals being recorded on the recording medium by the mechanism.

Figure 15:
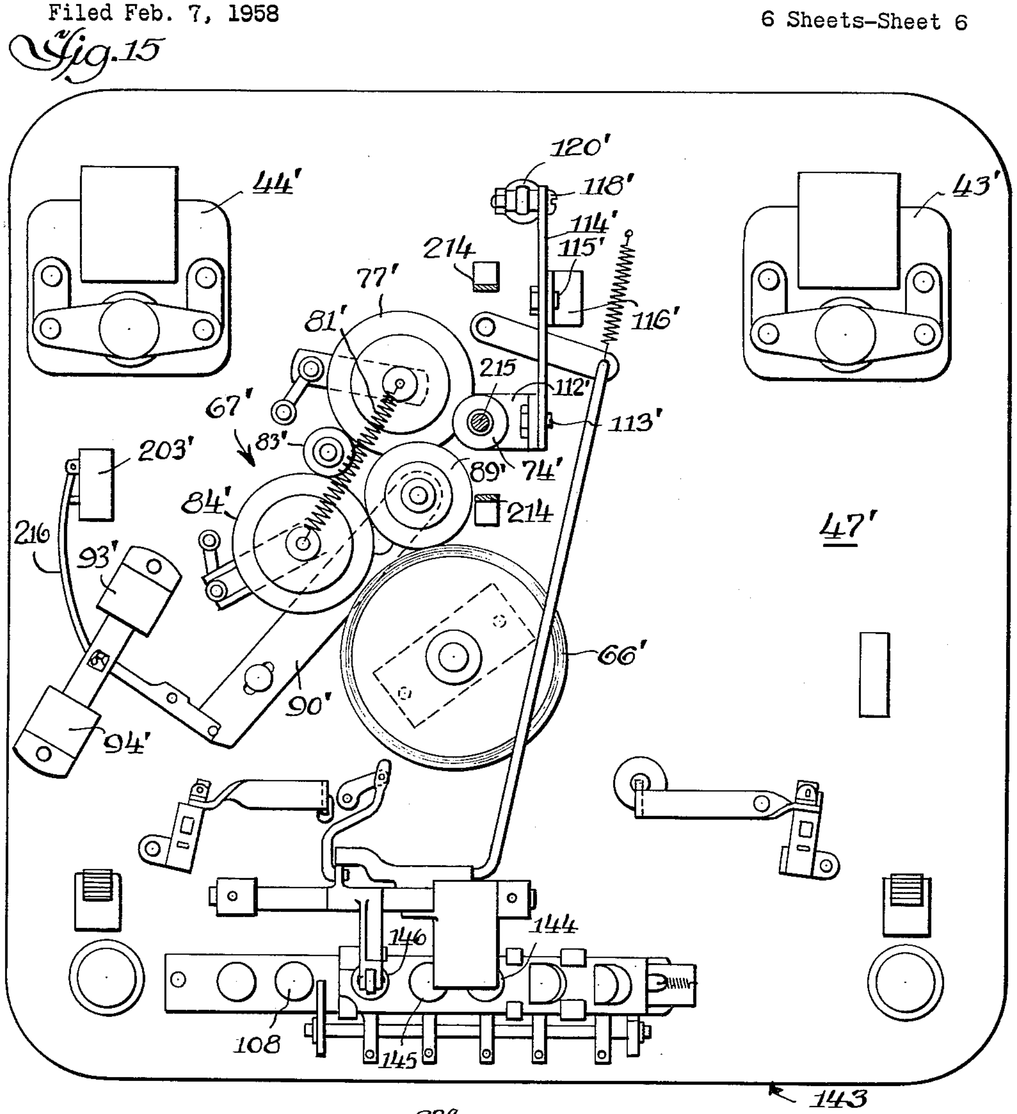
FIGURE 15 is a plan view of another embodiment of the present invention.

Another embodiment of the present invention is illustrated in FIGURE 15 wherein all of the drive and control elements are mounted on a single chassis deck plate rather than on two plates as described hereinabove. In this embodiment of the invention the reel supports are connected directly to reel drive motors 43′ and 44′ without interposing any slip clutch therebetween. These motors may be of the shiftable armature type for automatic coupling and decoupling the motor armatures and the reel supports, as desired.

The capstan drive motor, not shown in FIGURE 15 is mounted on a bracket 214 and depends from the chassis or deck plate 47′. The coupling between capstan motor shaft 215 and capstan flywheel 66′ includes an idler arrangement 67′ which is substantially the same as the idler arrangement 67 shown in detail in FIGURES 3 and 11. That is, a vertically shiftable speed-change roller 74′ is connected by a spline connection to the shaft 215 and drives idler 77′ which in turn drives roller 83′. The roller 83′ drives idler 84′. Idlers 84′ and 77′ are mounted on floating journals and are biased towards each other and toward roller 83′ by spring 81′.

Direction control solenoids 93′ and 94′ control shifting of a capstan direction shift bar 90′ to interpose a direction control idler 89′ between idler 84′ and capstan flywheel 66′ in the same manner as described above in conjunction with FIGURES 3 and 11 to reverse the direction of drive for the capstan.

Direction control solenoids 93′ and 94′ are coupled through a crank-like lever 216 to control a multiple pole doublethrow switch 203′ for controlling selective energization of the reel motors 43′ and 44′ and selective energization of the recording heads.

The control arrangement is otherwise the same as that described above except that in this embodiment of the invention the capstan speed control button has been removed from the control panel and placed at the back end of the machine as shown at 120′. The speed control arrangement in this embodiment of the invention is substantially the same as that shown in FIGURES 4 and 5. Speed-control button 120′ is pivotally connected as at 118′ to a lever 114′ that is pivoted as at 115′ on a bracket 116′ that depends from the underside of the deck plate 47′. The other end of the speed lever 114′ is pivotally connected as at 113′ to a shift bracket 112′ that is connected to the speed-change roller 74'. Thus, depressing the button 120' will raise the roller 74' to change the speed in the same manner as the mechanisms shown in FIGURES 4 and 5 are operated.

The remainder of the mechanism, such as the switches, carriage shifting mechanisms and control button assemblies are otherwise substantially the same as those described hereinabove with regard to the first described embodiment of the invention and are, therefore, not described in detail in conjunction with this embodiment of the invention. It should be understood, of course, that features of either of the embodiments of the invention herein described are interchangeable with features of the other embodiment of the invention.

From the foregoing it will be readily understood that numerous variations and modifications may be effected without departing from the true spirit and scope of the novel concepts and principles of this invention and that the embodiments described herein and illustrated in the drawings are merely illustrative embodiments of the invention.

I claim:

1. In a machine for driving an elongated magnetic record member between a pair of reels on which the member is wound, a support plate, a motor mounted on said support plate and having a rotatable shaft, a capstan journaled on said support plate and disposed to engage the record member and to drive the same, and coupling means to connect the rotatable shaft of said motor to said capstan to drive said capstan, said coupling means including a first idler journaled on said plate and disposed to drivingly couple said shaft and said capstan, and a second idler laterally shiftable and disposed to be drivingly interposed between and in engagement with said first idler and said capstan to provide a reversible drive for said capstan.

2. In a machine for driving an elongated magnetic record member between a pair of reels, a motor having a rotatable shaft, a capstan to engage the record member and to drive the same, and coupling means to connect said shaft of said motor to said capstan, said coupling means including a plurality of idlers which are driven by said shaft of said motor and which drive said capstan, at least one of said idlers being shiftable into and out of coupling engagement between said shaft of said motor and the other of said idlers whereby when said one of said idlers is in one position said capstan will be driven in one direction and when said one of said idlers is in its other position said capstan will be driven in an opposite direction without reversing the direction of rotation of said shaft of said motor.

3. In a machine for driving an elongated magnetic record member between a pair of reels, a motor having a rotatable shaft, a capstan to engage said record member and to drive the same, and coupling means to connect the shaft of said motor to said capstan, said coupling means including a radially shiftable idler engaging the shaft of said motor, a radially shiftable idler engaging said capstan, and a radially shiftable idler movable between first and second positions, said last mentioned idler being interposed between the second mentioned idler and the capstan in the first position thereof and being disengaged from said capstan in the second position thereof whereby the direction of rotation of the capstan is reversed when the last mentioned idler is shifted between its first and second positions without reversing the direction of operation of said motor.

4. In a machine for driving an elongated magnetic record member between a pair of reels, a motor having a rotatable shaft, a capstan to engage the record member and to drive the same, and coupling means to connect the shaft of said motor to said capstan, said coupling means including a first idler, a second idler, a shiftably mounted journal for said second idler, a third idler, and a shiftably mounted journal for said third idler, said first idler engaging the shaft of said motor and driving said second idler, said second idler in one position thereof being adapted to engage said capstan and drive the same, and said third idler being shiftable between first and second positions, in said first position thereof said third idler being interposed between said second idler and said capstan, and in said second position thereof said third idler being out of engagement with said capstan whereby said capstan is driven in one direction when said third idler is in its first position and said capstan being driven in an opposite direction when said idler is in its second position.

5. In a machine for driving an elongated magnetic record member between a pair of reels, a motor having a shaft, a capstan to engage the record member and to drive the same, and means coupling the shaft of said motor to said capstan, said coupling means including a roller connected to the shaft of said motor, and an idler driven by said roller and in driving connection with said capstan, said roller being axially movable to different positions and having different radii at said different portions along the length thereof with an intermediate tapered portion between the portions of different radii whereby the speed of the capstan is changed when the position of said roller is changed without disengaging said idler from said roller.

6. In a machine for driving an elongated magnetic record member between a pair of reels, a motor having a shaft, a capstan to engage the record member and to drive the same, and means coupling the shaft of said motor to said capstan, said coupling means including a roller on the shaft of said motor and driven thereby, said roller being axially movable on the shaft of said motor and having different radii at different axial portions along the length thereof with a tapered portion between the portions of different radii, an idler interconnecting said roller and said capstan and having a fixed axial position, and means to move said roller axially thereof to change the coupling ratio between said motor and said capstan without disengaging said idler from said roller whereby said capstan is continuously driven and is driven at different speeds when said roller is in different axial positions.

7. In a machine for driving an elongated magnetic record member between a pair of reels therefor, a motor having a shaft, a capstan to engage the record member and to drive the same, and means coupling the shaft of said motor to said capstan to drive the capstan, said coupling means including a roller shiftable axially between first and second positions, a pivotally mounted lever connected to said roller and means to move said lever whereby said roller is moved axially in continuous driving connection with said capstan to vary the speed of said capstan without changing the speed of said motor.

8. A machine for driving an elongated magnetic record member between a pair of reels therefor, a motor having a shaft, a capstan to engage the record member and to drive the same, and coupling means to connect the shaft of said motor to said capstan, said coupling means including an idler and a roller, said roller having a plurality of drive faces axially spaced thereon and a tapered portion therebetween, and means to axially move said roller to vary the coupling ratio between the shaft of said motor and said capstan without disengaging the driving connection therebetween.

9. In a machine for driving an elongated magnetic record member between a pair of reels therefor, a motor having a shaft, a capstan to engage the record member and to drive the same, and coupling means to connect the shaft of said motor to said capstan, said coupling means including a roller connected to the shaft of said motor, a shiftable idler coupling said roller to said capstan, said roller having a plurality of circumferential faces of different diameter axially sapced thereon with a tapered portion therebetween, a pivotally mounted lever connected to said roller and means to pivot said lever to axially shift said roller to vary the coupling ratio between the shaft of said motor and said capstan without disengaging the driving connection therebetween.

10. In a machine for driving an elongated magnetic record member between a pair of reels therefor, a motor having a shaft, a capstan to engage the record member and to drive the same, and coupling means to connect the shaft of said motor to said capstan, said coupling means including a plurality of shiftable idlers, means to shift one of said idlers into and out of coupling engagement between the shaft of said motor and said capstan, an axially movable roller having circumferential driving faces of different diameters axially spaced thereon, with a tapered portion therebetween, and means to axially move said roller to vary the drive coupling ratio between the shaft of said motor and said capstan without disengaging the driving connection therebetween.

11. In a machine for driving an elongated magnetic record member between a pair of reels therefor, a motor having a shaft, a capstan to engage the record member and drive the same, coupling means to connect said shaft of said motor to said capstan, and guide means disposed between said capstan and said reels to guide the elongated magnetic record member to said capstan from one of said reels and from said capstan to the other of said reels, said guide means including electrical contact elements cooperable with an electrical contact element on the record member, means forming a part of said coupling means to reverse the direction of operation of said capstan, and means coupling said contact elements in said guide means to control operation of the reversing means whereby when said contact element on the record member engages the contact elements of said guide means the direction of operation of said capstan will be reversed to reverse the direction of movement of said record member.

12. In a machine for driving an elongated magnetic record member between a pair of reels, a motor having a rotatable shaft, a capstan to engage the record member and to drive the same, and reversible coupling means to connect said shaft of said motor to said capstan, guide means in said machine to guide said record member to and from said capstan and to and from the reels, said guide means including a pair of contact elements arranged to cooperate with a contact element on said record member, and means connecting said contact elements of said guide means to said reversible coupling means to reverse the direction of operation of said capstan when the contact element of said record member connects with the contact elements in said guide means as said record member moves across said guide means.

13. In a machine for driving an elongated magnetic record member between a pair of reels, a motor having a rotatable shaft, a capstan to engage the record member and to drive the same, said capstan being reversibly coupled to said shaft of said motor, guide means to guide said record member to and from said capstan, said guide means including switching means, and means connecting said switching means to said coupling means to reverse the direction of operation of said capstan when a sensitized portion of said record member engages said guide means and closes said switch means.

References Cited in the file of this patent

UNITED STATES PATENTS

| | | |
|---|---|---|
| 2,200,574 | Davis | May 14, 1940 |
| 2,260,319 | Hoehn | Oct. 28, 1941 |
| 2,430,538 | Somers | Nov. 11, 1947 |
| 2,577,190 | Hare | Dec. 4, 1951 |
| 2,650,504 | Tateishi | Sept. 1, 1953 |
| 2,668,059 | Roberts | Feb. 2, 1954 |
| 2,681,224 | Bessire | June 15, 1954 |
| 2,687,882 | Pettus | Aug. 31, 1954 |
| 2,815,907 | McCormick | Dec. 10, 1957 |
| 2,838,305 | Hoehn et al. | June 10, 1958 |
| 2,865,637 | Roberts et al. | Dec. 23, 1958 |
| 2,898,409 | Tiger | Aug. 4, 1959 |
| 2,927,975 | Jamieson | Mar. 8, 1960 |
| 2,986,318 | Tiger | May 30, 1961 |